United States Patent
Parker, Jr.

(10) Patent No.: US 8,700,358 B1
(45) Date of Patent: Apr. 15, 2014

(54) METHOD FOR REDUCING THE REFRESH RATE OF FIBER BRAGG GRATING SENSORS

(75) Inventor: Allen R. Parker, Jr., Lancaster, CA (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 966 days.

(21) Appl. No.: 11/682,969

(22) Filed: Mar. 7, 2007

(51) Int. Cl.
*H04B 10/2519* (2013.01)
*G01N 21/25* (2006.01)
*G01J 1/04* (2006.01)
*G01B 11/16* (2006.01)
*G02B 6/00* (2006.01)
*G01D 5/353* (2006.01)
*G01L 1/24* (2006.01)

(52) U.S. Cl.
CPC ........... *G01D 5/35316* (2013.01); *G01L 1/246* (2013.01)
USPC ............... 702/189; 250/227.23; 250/227.14; 356/32; 356/33; 385/12; 385/13

(58) Field of Classification Search
CPC .............. H04B 10/2519; G01L 1/246; G01D 5/35316; G01B 11/16; G01K 11/32
USPC ................. 702/57, 66, 75–77, 104, 116, 189; 250/227.14, 227.18, 227.26, 227.12, 250/227.16, 227.21, 227.23; 325/477, 481, 325/305, 334; 356/32, 33, 477, 478, 480; 385/12, 13, 37
See application file for complete search history.

(56) References Cited

U.S. PATENT DOCUMENTS

| | | |
|---|---|---|
| 5,798,521 A | 8/1998 | Froggatt |
| 6,376,830 B1 | 4/2002 | Froggatt et al. |
| 6,545,760 B1 | 4/2003 | Froggatt et al. |
| 6,566,648 B1 | 5/2003 | Froggatt |
| 6,763,322 B2 * | 7/2004 | Potyrailo et al. .............. 702/189 |
| 6,856,400 B1 | 2/2005 | Froggatt |
| 7,042,573 B2 | 5/2006 | Froggatt |
| 7,109,471 B2 * | 9/2006 | Taverner .................. 250/227.14 |
| 7,411,676 B2 * | 8/2008 | Taverner et al. .............. 356/364 |
| 2005/0030886 A1 * | 2/2005 | Wu et al. ........................ 370/206 |
| 2006/0056764 A1 * | 3/2006 | Adachi et al. ................... 385/37 |
| 2007/0159635 A1 * | 7/2007 | Urey et al. ..................... 356/451 |
| 2007/0263208 A1 * | 11/2007 | Yelin et al. .................... 356/307 |
| 2008/0097225 A1 * | 4/2008 | Tearney et al. ............... 600/478 |

OTHER PUBLICATIONS

Childers et al., "Use of 3000 Bragg grating strain sensors distributed on four eight-meter optical fibers during static load tests of a composite structure", Technical Report: NASA-2001-8spie-bac, Year of Publication: 2001.*

(Continued)

*Primary Examiner* — Michael Nghiem
*Assistant Examiner* — Yoshihisa Ishizuka
(74) *Attorney, Agent, or Firm* — Mark Homer

(57) ABSTRACT

The invention provides a method of obtaining the FBG data in final form (transforming the raw data into frequency and location data) by taking the raw FBG sensor data and dividing the data into a plurality of segments over time. By transforming the raw data into a plurality of smaller segments, processing time is significantly decreased. Also, by defining the segments over time, only one processing step is required. By employing this method, the refresh rate of FBG sensor systems can be improved from about 1 scan per second to over 20 scans per second.

8 Claims, 3 Drawing Sheets

(56) References Cited

OTHER PUBLICATIONS

Bang et al., "Optical Fiber Sensor Systems for Simultaneous Monitoring of Strain and Damage in Smart Composites". Smart Materials and Structures, vol. 14, No. 5, Oct. 2005, pp. N52-N58(1).*

Azana et al., "Reconstruction of Fiber Grating Period Profiles by use of Wigner-Ville Distributions and Spectrograms", J Opt Soc Am A Opt Image Sci Vis. Dec. 2000; 17(12):2496-2505.*

Muriel et al, "Time-frequency representation applied to fiber gratings synthesis" 24th European Conference on Optical Communication, Publication Date: Sep. 20-24, 1998, vol. 1, on pp. 383-384.*

Nuruzzaman et al, "Time-Stretched Short-Time Fourier Transform", Proceedings of the 21st IEEE Instrumentation and Measurement Technology Conference, Publication Date: May 18-20, 2004, vol. 1, on pp. 31-34.*

"Use of 3000 Bragg grating strain sensors distributed on four eight-meter optical fibers during static load tests of a composite structure," Childers, et al.

* cited by examiner

METHOD FOR REDUCING THE REFRESH RATE OF FIBER BRAGG GRATING SENSORS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to improving sensors, more particularly to improving Fiber Bragg Grating (FBG) sensors and most specifically to improving the interrogation refresh rate of fiber bragg grating sensors.

2. Description of the Related Art

FBG sensors, which are basically gratings along optical fibers that act as mirrors to light sources, provide many attractive characteristics compared to other sensing systems. These include their inherent light weight, small size, and immunity to electromagnetic, radiation, and radio-frequency interference.

These features enable using many sensors on a single optical fiber at either interval or arbitrary spacing. Thus, a user can interrogate each sensor independently and obtain a distributed measurement over large structures. Because the gratings are multiplexed on a single fiber, many sensors can be accessed with a single connection to the optical source and detector. Conventional electronic strain gauge sensors require each sensor to have its lead wires attached and routed to the sensor readout. Therefore, for many types of large structures or remote sensing, FBG sensors provide a significant improvement over electronic strain gauge sensors.

Due to the above, FBG sensors are highly attractive to the aerospace community. For example, U.S. Pat. No. 5,798,521 discloses an apparatus and method for measuring strain in structures using a plurality of FBG sensors and an improvement to this apparatus and method is disclosed in U.S. Pat. No. 6,566,648. These patents are hereby incorporated by reference into this application. While the systems described in these patents do provide certain advantages to electronic strain gauge systems, one major disadvantage relates to the interrogation refresh rate. The maximum interrogation refresh rate employing the system described in U.S. Pat. Nos. 5,798,521 and 6,566,648 has been improved to approximately 1 scan per second. However, the desired refresh rate for strain sensor systems for the aerospace community is about a minimum of 10 scans per second.

Therefore, it is desired to provide an Optical Frequency Domain Reflectometry (OFDR) FBG sensor system that increases the refresh rate so OFDR FBG sensor systems may be employed by the aerospace community and other industrial communities requiring increased sensor refresh rates.

SUMMARY OF THE INVENTION

The invention proposed herein comprises a method of increasing the interrogation refresh rate of FGB sensors to enable their use more widely within the aerospace community and within other industrial communities requiring sensor systems having fast refresh rates. More specifically, the invention significantly decreases the time needed to process the raw data obtained in each scan of an FGB sensor, so the sensor refresh rates are significantly increased.

Accordingly, it is an object of this invention to provide an improved OFDR FBG sensor system.

It is a further object of this invention to provide a method of increasing the interrogation refresh rate of FGB sensors.

This invention meets these and other objectives related to improved sensors by providing a method of increasing the interrogation refresh rate of FOB sensors. Using a linearly sweep tunable laser source, a first scan of the gratings along the fibers is taken during a single sweep. This results of a raw data stream of data over a period of time. This raw data stream is divided into a plurality of segments, based on a portion of the time period. The data segments are transformed, using a Fourier Transform, resulting in frequency/grating position (GP). Each transformed segments represents the frequency content of a single time slice of the original raw data. When this data is plotted where the wavelength data is equivalent to the time to obtain the data segments, the locations of the gratings of the FOB sensors can be determined. From this information, a center of mass calculation can be performed to obtain a final reading for each grating. Because this method increases the speed of processing the information tremendously, the next scan of the gratings along the fiber may be done more quickly than using previous methods. When the method is repeated, a second set of grating location data is obtained. The change in strain can be seen by comparing the sets of data.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

Figure 1:
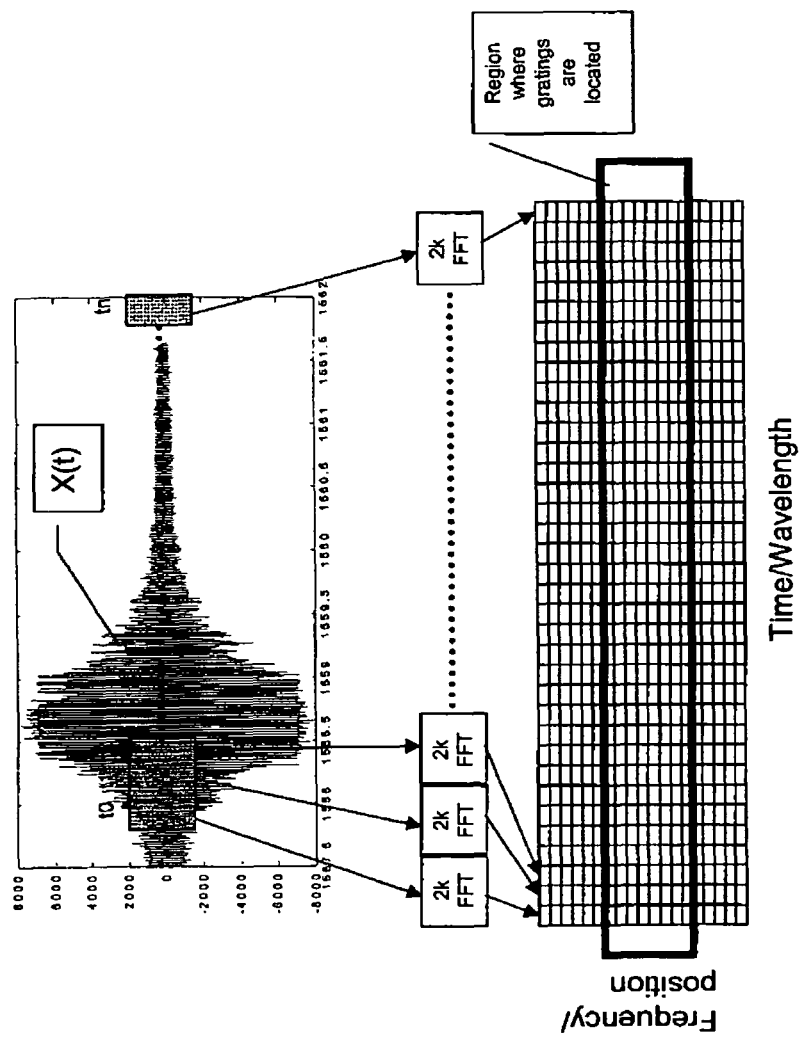
FIG. 1 depicts a graphical representation of raw data obtained from FGB sensor signals over time transformed into frequency/GP by time/wavelength data.

FBG sensors operate under the principle that a change in strain or temperature alters the sensor grating spacing which shifts the reflected wavelength proportionally. To measure wavelength shifts that result directly from changes in temperature or strain, OFDR FBG sensor systems must include a light source that continuously interrogates the reflection spectrum and a detection module that records the shifts in the peak reflectivity versus wavelength.

The interrogation refresh rate for OFDR FBG sensor systems depend on the speed of the optical source, the bandwidth of the detectors, the data acquisition rate, and the rate at which the analysis of the wavelength shift can be performed. Due to the latter factor, the rate at which the analysis of the wavelength shift can be performed, current OFDR FBG sensor systems cannot effectively be employed for in situ aerospace systems. This is due to the fact that current OFDR FBG sensor systems have a refresh rate of about 1 scan per second, mainly resulting from the extended time required to accomplish the wavelength shift analysis. However, in situ general aerospace system analysis requires a refresh rate of about 10 scans per second to be useful.

The current method of processing the data in order to analyze the wavelength shift is as follows. All of the data is processed using a large order Fast Fourier Transform (FFT) to map the wavelength varying FBG sensor signal into its frequency components. This is followed by a series of much smaller inverse FFTs for each grating of interest on the FBG sensor. Basically, the data is transformed into a frequency/GP signal in order to obtain the location of each grating and its associated data and then back into a time/wavelength signal. Unfortunately, because the complexity of FFTs increases with increased order, the large order FFT is an inefficient method of processing the data. This is a major factor in the relatively slow interrogation refresh rate of current OFDR FBG sensor systems.

For the below description of the present invention, the time periods discussed herein are analogous to wavelength data and may be used interchangeably. Also, the term frequency data is analogous to position data in that the frequency data is the position on the fiber or length traveled down the fiber.

The present invention uses a different approach to processing the data from the FBG sensors to obtain increased interrogation refresh rate. In general, the invention provides a method of obtaining the FBG data in final form (transforming the raw data into frequency and time/wavelength data) by taking the raw FBG sensor data and dividing the data into a plurality of segments over time/wavelength. By transforming the raw data into a plurality of smaller segments, processing time is significantly decreased. Also, by defining the segments over time/wavelength, only one processing step is required (rather than requiring the inverse FFT step described above after initial transformation). By employing this method, the refresh rate of FBG sensor systems can be improved from about 1 scan per second to over 24 scans per second, using current processing technology.

More specifically, the invention comprises an improved method for obtaining final sensor data from raw FBG sensor data. Because the improved method is significantly faster than previous methods, the refresh rate of the FBG sensor system is significantly increased. Raw data is received from a plurality of FBG gratings located along a single fiber. The raw data stream is divided into a plurality of raw data segments; each raw data segment is associated with a portion of the time/wavelength. An FFT is performed on each raw data segment to obtain frequency/positional magnitudes. The computed frequency magnitudes for a given data segments gives indication of the presence of a grating response for the corresponding time/wavelength. This magnitude information is accumulated from one data segment to the next throughout the raw data stream.

To complete the processing of the information in order to obtain changes in strain (or temperature, etc.) related to the FBG sensor(s), a center-of-mass (CM) calculation is performed. A CM calculation is performed for each frequency/GP of interest, with respect to the accumulated data segment results. When the center of mass data for each grating is identified for second and subsequent scans, this data can be analyzed by comparing it to previous scan data to determine the change in strain on the sensor(s).

For the above discussed dividing step of the method, various methods may be employed. For example, a window function may multiply the raw data in order to divide the raw data into segments. The window function can be expressed as w(t) where t is the time period selected for each data segment. An alternative method of dividing the raw data stream may be the use of wavelet transformation, which is discussed further below.

The size of the preferred time period selected, which relates directly to the number of data points in each segment, is dependent upon several factors. In general, the larger time period selected, the better frequency resolution obtained but an increased processing time. However, the smaller the time period selected, the more quickly the data can be processed but decreased frequency resolution. In addition, the selection will depend upon the number of gratings per fiber and the distance between the gratings. As the grating placement is further apart on the fiber, the less data is required to identify the locations accurately (and, therefore, a smaller time period may be selected). In a preferred embodiment of the invention, a time period is selected that provides between 512 points of data and 2048 points per data segment for gratings being separated on a fiber from 0.5 to 2 inches on a 20 ft fiber. In a most preferred embodiment of the invention, when gratings are separated by 0.5 inches along a fiber, a time period is selected that provides 2048 points of data per segment.

For the above discussed transforming step, many types of transformation methods may be employed. In general, a transformation method should be able to transform the data segments quickly from time/wavelength data into frequency/position data. Preferably, the transformation method will treat time and wavelength data as analogous and frequency and position data as analogous. Some preferred transformation methods include Short-Time Fourier Transform (STFT), Wavelet Transformation (WT), a Goertzel algorithm, and Wigner-Ville Distribution (WVD).

STFT is a Fourier-related transform used to determine the frequency and phase information of small signal segments as they changes over time. A preferred example of an STFT algorithm that may be employed in the present invention is:

$$\text{STFT}\{x(\ )\}=X(\tau,\omega)=\int_{-\infty}^{\infty}x(t)w(t-\tau)e^{-j\omega t}dt \quad (1)$$

where t is time, w(t) is the window function, ω is the frequency, and x(t) is the raw data stream.

WT is inherently a time-frequency analysis of a signal. Therefore, it is similar to STFT analysis in that it uses finite duration basis functions to estimate the transform, but different in that the length of the support is a function of frequency. Because WT inherently divides the raw data being processed into segments, when WT is employed in the present invention, it provides both the dividing means and transforming means of the method. An example of a WT that may be adapted for use in the present invention is:

$$W_X(s,b)=1/\sqrt{s}\int x(u)\psi(u-b/s)du \quad (2)$$

where x(u) is the signal to be transformed, ψ is the wavelet, and b and s are the time shift and scale respectively.

While a general FFT algorithm computes evenly across the spectrum along a fiber, a Geortzel algorithm is designed to look at only specific frequencies. Generally, the Goertzel algorithm was designed to detect certain tones, for example in a dual-tone, multi-frequency decoder.

WVD is a time-frequency distribution concept which also may be employed in the present invention. An example of a WVD that may be adapted for use in the present invention is:

$$W_X(t,\omega)=\int x(t+\tau/2)x^*(t-\tau/2)e^{-i\omega\tau}d\tau \quad (3)$$

where t is time, ω is frequency, and x(t) is the raw data stream being transformed.

The following is an example of the present invention employing an STFT transformation method. To reduce the numerical computation required, a series of low ordered FFTs sequencing through the wavelength varying FBG signal is presented for interrogating these FBGs. Simply described, the function to be transformed is multiplied by a window function which is nonzero for only a short period of time. The Fourier Transform of the resulting signal is taken as the window moves along the time axis, resulting in a function representing frequency and magnitude of the signal over time. The continuous-time STFT can be expressed as:

$$STFT\{x(\ )\} \equiv X(\tau,\omega) = \int_{-\infty}^{\infty} x(t)w(t-\tau)e^{-j\omega t}dt \qquad (4)$$

where the time (t) variable used relating to FBG signals is analogous to the variable wavelength ($\lambda$) and, likewise, frequency ($\omega$) is analogous to position ($\rho$). Position represents grating location along a fiber. Here, w(t) is the window function and x(t) is the FBG signal to be transformed while X($\tau$, $\omega$) is the resulting Fourier Transform of x(t)w(t−$\tau$).

FIG. 1 is a block diagram that shows the transformation of the raw data graphically. As can be seen, time periods t0, t1, t2, etc. are selected to provide 2048 points of data per segment. The data is plotted below the graph showing frequency/position data by time/wavelength data arranged in columns of 1024 points represent half of the Fourier frequency spectrum. In essence, each column represents the physical fiber with associated grating locations at a given time slice. The region in the middle of the data plot is where the gratings are located, with respect to the time/wavelength. Each cell along a column within this region represents 0.5 inch spacing along the fiber which represents approximately one grating.

Figure 2:
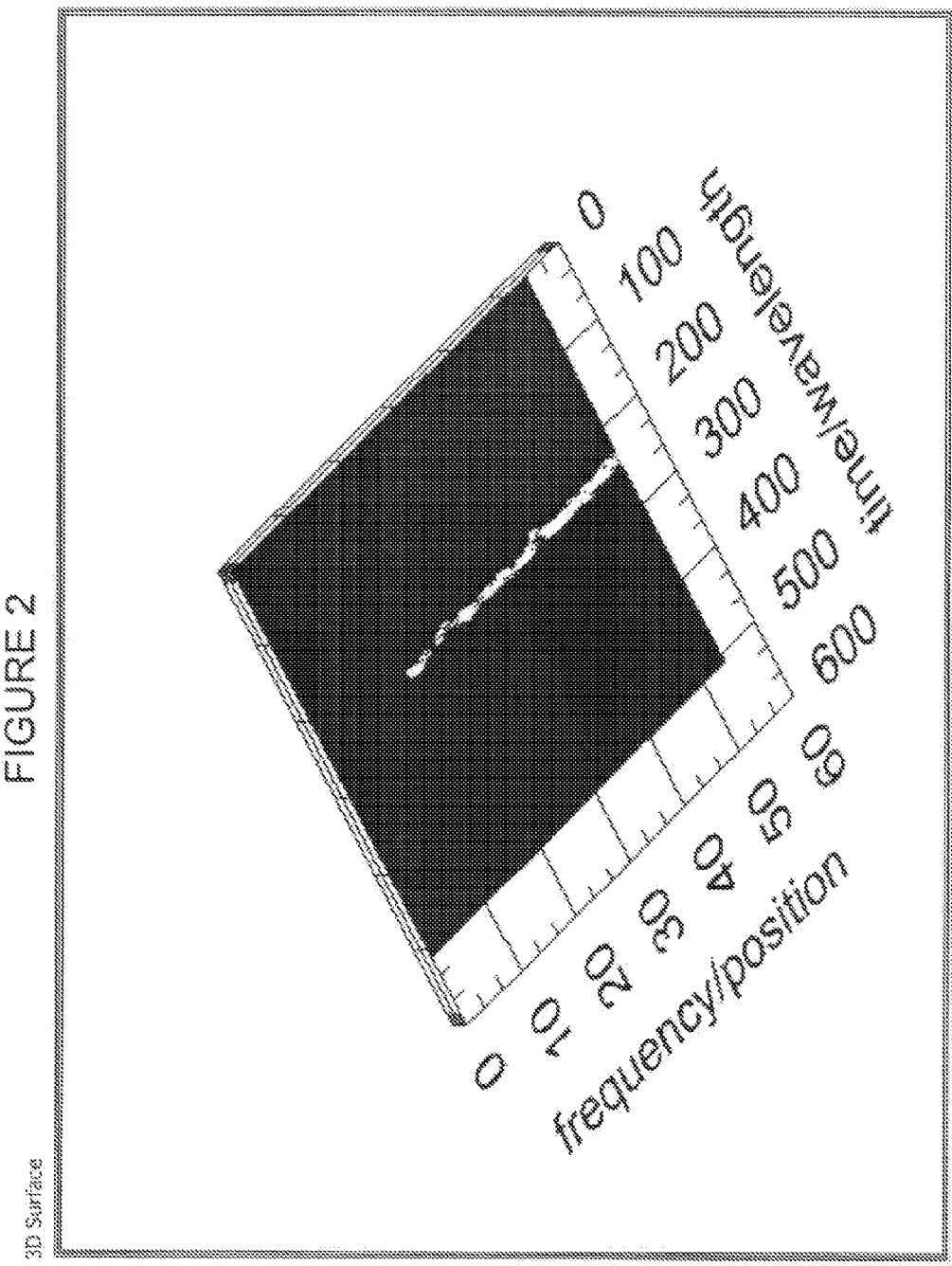
FIG. 2 depicts frequency/GP data by time/wavelength data obtained from FGB sensors on a metallic bending beam without strain.
Figure 3:
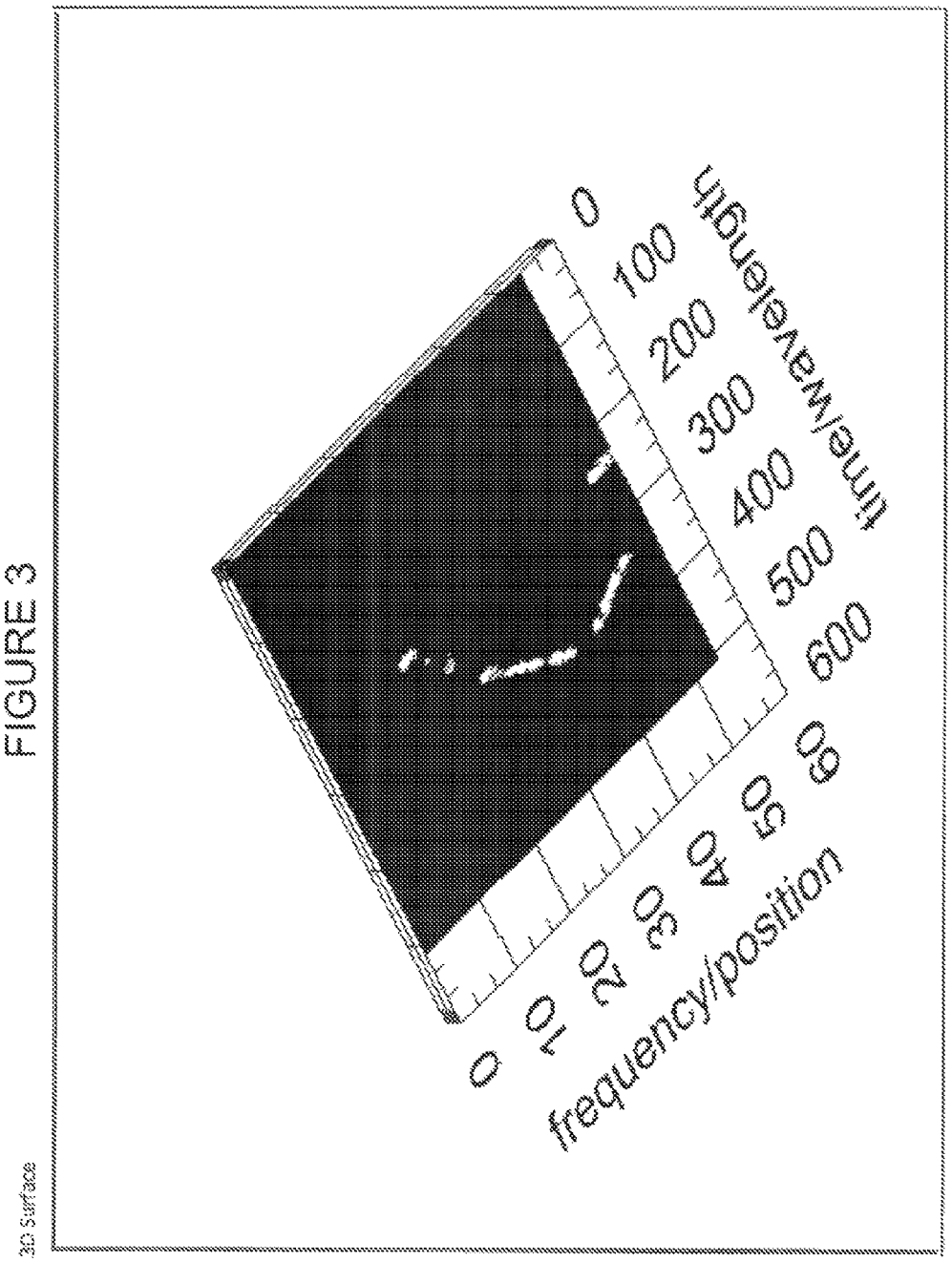
FIG. 3 depicts frequency/GP data by time/wavelength data obtained from FGB sensors on a metallic bending beam with strain.

A center of mass calculation is performed at each grating position index of interest with respect to time to achieve the final $\Delta\lambda/\lambda$ which is proportional to strain. FIGS. 2 and 3 show results using this method of a steel cantilever beam without and with an applied load, respectively.

By implementing the discrete-time variation of the above equation a maximum repetition rate of 24 was achieved. The noise was within +/−5 µε and match to within 3-5% of conventional strain gage measurements which were co-located. Using this method, an FBG sensor refresh rate of 24 scans per second has been achieved.

What is described are specific examples of many possible variations on the same is invention and are not intended in a limiting sense. The claimed invention can be practiced using other variations not specifically described above.

What is claimed is:

1. A method for obtaining final wavelength Optical Frequency Domain Reflectometry data from raw Fiber Bragg Grating sensor data, comprising the steps of:
   providing a light source that continuously interrogates a plurality of Fiber Bragg Gratings along at least one fiber, said Fiber Bragg Gratings written at the same wavelength, over one scan having a time period;
   receiving a stream of raw Fiber Bragg Grating sensor data from the plurality of Fiber Bragg Gratings;
   dividing the stream of raw Fiber Bragg Grating sensor data into a plurality of raw data segments, each raw data segment associated with a portion of the time period;
   using a processor to transform each of the raw data segments into functions representing frequency magnitude over time;
   plotting transformed raw data segments by frequency magnitude data versus time data;
   identifying the location of each grating on the at least one fiber from the plot of frequency magnitude data versus time data wherein the time data correlates to wavelength data;
   accumulating frequency magnitude data for each data segment; and,
   performing a center of mass calculation for each grating location with respect to the accumulated frequency magnitude data for each data segment to obtain final wavelength sensor data for each grating location.

2. The method of claim 1, wherein the dividing and transforming steps comprise a method employing an approach selected from Short-Time Fourier Transform, Wavelet Transformation, and a Goertzel algorithm.

3. The method of claim 1, wherein the dividing and transforming steps comprise a method employing a Short-Time Fourier Transform approach.

4. The method of claim 3, wherein the dividing step comprises multiplying the stream of raw Optical Frequency Domain Reflectometry Fiber Bragg Grating sensor data by a window function.

5. The method of claim 4, wherein the dividing and transforming steps are performed using the equation $$STFT\{x(\ )\} \equiv X(\tau, \omega) = \int_{-\infty}^{\infty} x(t)w(t-\tau)e^{-j\omega t}dt$$

where t is time, w(t) is the window function, $\omega$ is the frequency, and x(t) is the stream of raw Optical Frequency Domain Reflectometry Fiber Bragg Grating sensor data.

6. The method of claim 5, wherein the raw data segments comprise from 512 points of data to 2048 points of data.

7. The method of claim 6, wherein the raw data segments comprise 2024 points of data.

8. The method of claim 1, further comprising:
   receiving a second stream of raw Fiber Bragg Grating sensor data from the plurality of gratings from the at least one fiber over a second scan having a time period;
   repeating the dividing, transforming, accumulating, plotting, identifying, and performing steps for the second stream of raw Fiber Bragg Grating sensor data; and,
   calculating a change in final wavelength sensor data between the streams of raw Fiber Bragg Grating sensor data from the one scan and the second scan.

* * * * *